United States Patent Office 3,763,064
Patented Oct. 2, 1973

3,763,064
POLYESTER RESIN COMPOSITIONS USEFUL AS DURABLE BODY OR HAND BUILDERS FOR TEXTILE MATERIALS
Arnold James Soliday, Charlotte, N.C., assignor to American Cyanamid Company, Stamford, Conn.
No Drawing. Continuation-in-part of application Ser. No. 94,169, Dec. 1, 1970. This application Mar. 13, 1972, Ser. No. 234,298
Int. Cl. C08g 17/10, 17/16, 37/34
U.S. Cl. 260—21
8 Claims

ABSTRACT OF THE DISCLOSURE

Compositions which are useful as body or hand builders for textile materials, and which are durable to laundering. The compositions are aqueous dispersions of polyester resin with nonionic or anionic surfactants and are applied to cellulosic fabrics together with a thermosetting, aminoplast resin. The polyester resins are products of the reaction of a lower alkylene glycol with a mixture of three polybasic acids, viz (1) an aromatic dibasic carboxylic acid, (2) a polymeric product of a long chain polyunsaturated acid, and (3) a lower unsaturated aliphatic acid.

CROSS-REFERENCE TO RELATED APPLICATION

This application is a continuation-in-part of copending application Ser. No. 94,169, filed Dec. 1, 1970, now abandoned.

BACKGROUND OF THE INVENTION

(1) Field of the invention

The invention pertains to body or hand builders for fabrics.

(2) Description of the prior art

Many water-soluble materials have been used to build hand or body in fabrics, particularly those containing cellulosic fibers. Such water-soluble materials are commonly called "sizes" and they include starches, gums such as tragacanth, karaya, arabic, etc.; sodium alginate; methyl cellulose; gelatin, etc. These water-soluble materials are applied to the textile materials by the mills and finishers. Certain of the water-soluble materials, such as starches, can also be applied to fabrics in the home, normally during the laundering of fabrics and garments. Since these materials are water-soluble, they are not durable to laundering and must be reapplied after laundering.

It has now been discovered that when a dispersion or emulsion of a certain class of polyester resins in water is applied to textile materials, particularly materials containing cellulosic fibers, and excellent hand building finish is obtained. When the polyester resin dispersion is applied in combination with a thermosetting aminoplast resinous finish, the hand building finish is durable to repeated launderings. The compositions of this invention are solutions in organic solvents of polyester resin and surface active agents which aid in the formation of dispersions or emulsions of the solutions in water.

SUMMARY OF THE INVENTION

The invention is compositions which are useful as body and hand builders for textile materials, and which are durable to laundering and the process for applying the composition to the textile material. The compositions are solutions in perchloroethylene of (1) a polyester resin, prepared by reacting 100 parts of lower alkylene glycol with 160 to 210 parts of an aromatic dicarboxylic acid, 70 to 100 parts of a dimerized fatty acid and 5 to 10 parts of a lower unsaturated aliphatic dibasic acid, and (2) a nonionic or anionic surfactant wherein the solution contains between 45% and 60% of polyester resin, and between 22% and 35% of perchloroethylene.

DESCRIPTION OF THE PREFERRED EMBODIMENT

This invention relates to a hand modifier for textile materials. More particularly, it relates to solutions in organic solvents of polyester resins and surface active agents. It alo relates to the use of aqueous dispersions and emulsions of such solution as finishes for textile materials and to the textile materials thus treated.

The "hand" or "handle" of a fabric or garment is one of its most important features. Textile finishes can do much to modify it in any required direction. A given textile material can be made soft or stiff. It can also be given weight or body.

The polyester resins useful in this invention are the products obtained by reacting a lower alkylene glycol, such as ethylene glycol, propylene glycol or mixtures thereof, with a mixture of three classes of polybasic acids. The first polybasic acid is an aromatic dicarboxylic acid, preferably phthalic acid, but including isophthalic, terephthalic and the like acids. The second polybasic acid is a dimerized aliphatic fatty acid, i.e., a polymeric acid obtained by heating polyunsaturated fatty acids, consisting predominantly of dimers, trimers and tetramers. The monomeric acid from which the dimers are formed may have from about 12 to 24 carbon atoms in the chain. The preferred dimerized fatty acid is prepared from $C_{18}$ polyunsaturated fatty acids, such as linoleic acid, and contains 75% of $C_{36}$ dibasic acid and 25% of $C_{54}$ tribasic acid. The third polybasic acid is a lower unsaturated aliphatic dibasic acid, of up to about 10 carbon atoms, preferably fumaric acid and the like.

The polyester resin is prepared by heating a mixture of the glycol or glycols and the three types of polybasic acids at an elevated temperature in accordance with well-known procedures. For example, in preparing the polyester resin, for each 100 parts of glycol, 160 to 210 parts of polybasic aromatic acid, 70 to 100 parts of dimerized acid, and 5 to 10 parts of lower unsaturated fatty acid are used.

The polyester resin of use in this invention is soluble in a number of types of organic solvents: aromatic hydrocarbons such as xylene; aliphatic halo hydrocarbons, such as methylene chloride, trichlorethylene and perchloroethylene; aliphatic hydroxy compounds, such as ethylene glycol, diethylene glycol, hexylene glycol, diisobutyl carbonol and butyl carbitol, etc. Perchloroethylene provides the most satisfactory composition, particularly as to solvent power, boiling point, nonflammability and stability of the dispersion of the composition in water.

A wide variety of surface active agents may be employed in the compositions of this invention. They include nonionic surface active agents, such as alkyl phenols reacted with 1.5–50 moles of ethylene oxide; $C_{12}$–$C_{14}$ mixed aliphatic alcohols reacted with 7–14 moles of ethylene oxide; castor oil reacted with 36–45 moles of ethylene oxide; $C_{12}$–$C_{18}$ mixed aliphatic amines reacted with 5–15 moles of ethylene oxide; tridecyl alcohol reacted with 3–15 moles of ethylene oxide; long-chain aliphatic carboxylic amides reacted with 5–50 moles of ethylene oxide; sorbitan ester; ethoxylated sorbitan esters; coconut amides; etc.; and anionic surface active agents, such as ammonium xylene sulfonate and sodium xylene sulfonate, and the like. Surface active agents containing more than trace amounts of water (0–2%) will not provide good dispersing properties. The preferred agents are the nonionic surface active agents of the ethoxylated alkyl phenol and the coconut amide type, or combinations of the same.

Best results are obtained by use of a combination of a product obtained by reacting nonylphenol with about 30 moles of ethylene oxide and a product obtained by reacting coconut oil with 2 moles of diethanolamine.

Sufficient solvent should be employed to completely dissolve the polyester resin and dispersing agents. Between 0.2 and 1 part, preferably between 0.4 and 0.6 part, of perchloroethylene should be used per part of polyester resin.

The amount of ethoxylated alkyl phenol should be between 0.2 and 1.0 part, preferably between 0.2 and 0.3 part, per part of polyester resin. The amount of coconut amide should be between 0.1 and 1.0 part, preferably between 0.1 and 0.2 part, per part of polyester resin.

In the preferred procedure for preparing the solutions of this invention, the polyester resin and the ethoxylated alkyl phenol are dissolved in perchloroethylene at a temperature of between 75° and 95° C. The solution is then cooled to a temperature below 50° C., preferably between 30° and 40° C., and the coconut amide is added.

The solutions contain between 45% and 60%, preferably between 50% and 56% of polyester resin, between 22% and 35%, preferably between 26% and 30%, of perchloroethylene, between 10% and 15%, preferably between 11% and 13%, of ethoxylated nonylphenol, and between 4% and 8%, preferably between 5% and 7%, of coconut amide.

A particularly preferred composition contains 53.3% polyester resin, 28.7% perchloroethylene, 12.0% ethoxylated nonylphenol and 6.0% of coconut amide.

The compositions of the invention are applied to textile materials from aqueous dispersions or emulsions. The dispersions should contain between 0.5% and 20%, preferably between 1.0% and 10% of polyester resin. The aqueous dispersions or emulsions should be made from freshly prepared solutions of polyester resins and surface active agents.

When the aqueous dispersions are applied to cellulosic fabrics, it is necessary to apply the compositions of this invention in combination with thermosetting, aminoplast, resinous, wrinkle-recovery and durable press finishes. Such finishes are well known in the art and are the reaction products of formaldehyde with ureas including cylic ureas, melamines, triazones, carbamates, etc. Representative members of these classes of textile finishes include N,N'-dimethylolurea, tetramethylolurea, N,N'-dimethylolethyleneurea, N,N' - bis(methoxymethyl)uron, N,N' - dimethylol-4,5-dihydroxyethyleneurea, dimethylolmelamine, partially methylated trimethylolmelamine, hexakis(methoxymethyl)melamine, N,N' - dimethylol-5-hydroxyethyltriazone, methylolated hydroxyethyl carbamate, etc. The preferred material for durable press finishes is N,N'-dimethylol-4,5-dihydroxyethyleneurea.

The aminoplast finishes are applied to the cellulosic textile materials in conventional amounts, 5–45% based on the weight of the textile materials, and are cured on the textile materials by application of heat in the presence of conventional acid-acting curing catalysts. Such catalysts include the metal salt types such as zinc nitrate and magnesium chloride. Delayed curing procedures may be used for durable press finishes.

The amount of polyester resin applied to the textile material should be between 0.25% and 8%, preferably between 0.5% and 5%, based on the weight of the textile material.

The compositions of this invention can be applied to the textile material by conventional procedures for applying aqueous finishes, such as padding, dipping, spraying, etc.

The treated material is dried and the finish is heat cured at a temperature between 275° F. and 425° F., preferably between 275° F. and 400° F. Any convenient temperature can be used for the drying, but short drying periods at 200–230° F. are preferred. The drying and the heat curing can be done at the same time.

The cellulosic textile materials on which the finish is applied include all the cellulosic fibers, such as cotton, viscose, linen, ramie, etc., and mixtures thereof. Blends of cellulosic fibers and synthetic fibers, such as polyesters (Dacron), polyamides (nylon), etc., may be used.

The aqueous dispersions may be applied to 100% synthetic fabrics by the procedures described above. In this situation it is not necessary to use an aminoplast resinous finish and only drying is required, although a heat curing step may be used.

EXAMPLE 1

A polyester was prepared by reacting 3800 parts of a 60/40 mixture of ethylene glycol/propylene glycol with 7500 parts of phthalic acid, 3094 parts of a "dimer acid," and 238 parts of fumaric acid. The dimer acid, obtained by polymerization of polyunsaturated fatty acids with 18 carbon atoms, had an acid value of 189–197 and a saponification value of 191–199, and contained about 75% of $C_{36}$ dibasic acid and 25% of $C_{54}$ tribasic acid. The reaction conditions were those conventionally used for making polyester resins of this type.

To a suitable reactor containing 15,990 parts of polyester at 90° C., there were added with good agitation 8610 parts of perchloroethylene at a temperature of 80–90° C. and 3600 parts of Surfactant A which had been premelted. The batch was then cooled to 40° C. and 1800 parts of Surfactant B were added. Cooling was continued to about 30° C. The product was a stable solution containing 53.5% polyester resin.

Surfactant A is the reaction product of nonylphenol and about 30 moles of ethylene oxide.

Surfactant B is the reaction product of two moles of diethanolamine with one equivalent of coconut oil.

EXAMPLE 2

To a suitable vessel containing 8800 parts of the polyester of Example 1 and 4700 parts of perchloroethylene there were added at 50°–65° C. 2850 parts of Surfactant A and 990 parts of Surfactant B, followed by sufficient water to provide an aqueous dispersion containing about 36% solids.

EXAMPLE 3

Two aqueous pad baths, I and II, were prepared containing 11.3% of 1,3-dimethylol-4,5-dihydroxyethyleneurea and 1.25% of zinc nitrate. Pad Bath II also contained 5.0% of the product of Example 1. The pad baths were applied by a standard padding procedure to a shirting material containing 65% of polyester fibers and 35% of cotton fibers obtaining a 60% wet pickup. Thus, after padding, both fabrics contained 6.75% of 1,3-dimethylol-4,5-dihydroxyethyleneurea, and Fabric II also contained 3.0% of the product of Example 1. Both of the fabrics were dried at 225° F., steamed for 5 seconds, pressed for 5 seconds at 350° F., and heated in an oven at 320° F. for 8 minutes.

Both treated fabrics had good wrinkle resistance and other desirable durable press properties. Fabric II exhibited an excellent hand with better body and bulk as compared with Fabric I. These hand properties were durable to repeated launderings.

EXAMPLE 4

When the procedure of Example 3 (Pad Bath II) is repeated with substitution of a 50/50 polyester/rayon fabric for the 65/35 polyester/cotton fabric, the polyester/rayon fabric acquires an excellent hand and good wrinkle resistance.

EXAMPLE 5

When the procedure of Example 3 (Pad Bath II) is repeated with substitution of 10% of the product of Example 1 and a 100% cotton fabric, the fabric acquires an excellent hand.

EXAMPLE 6

When the procedure of Example 3 (Pad Bath II) is repeated with substitution of magnesium chloride for the zinc nitrate, the fabric acquires an excellent hand.

EXAMPLE 7

Two pad baths, I and II, were prepared, each containing 6.5% of 1,2-dimethylol-4,5-dihydroxyethyleneurea, 0.84% magnesium chloride, 2% of commercial softening agent A and 0.2% of commercial nonionic surface active agent C. Pad Bath II also contained 1.45% solids of the product of Example 2.

Agent A is an aqueous dispersion of 20 parts of polyethylene, 6 parts of polyethylene glycol 600 monohydrate and 4 parts of coconut oil ethanolamine in water.

Agent C is the reaction product of one mole of nonylphenol with about 9.5 moles of ethylene oxide.

The pad baths were applied by a standard padding procedure to a 50/50 polyester/cotton knit fabric obtaining a 56% wet pickup. Thus after padding both fabrics contained 3.6% of 1,3-dimethylol-4,5-dihydroxyethyleneurea, and Fabric II also contained 0.81% solids of the product of Example 2. Both fabrics were dried at 225° F. and then heated at 425° F. for 2 minutes.

Both treated fabrics had a better appearance than the untreated fabric. Fabric A was similar to untreated fabric in hand, while Fabric B was firmer than either and the firmness was durable for at least three launderings in a home-style washing machine.

EXAMPLE 8

A pad was prepared containing 12.5% of 85/15 bis-(methoxymethyl) uron/(hexamethoxymethyl) melamine, 1.5% magnesium chloride, 0.125% aluminum chloride, 1.8% solids of the product of Example 2, 3.0% of softening agent A and 0.2% of surface active agent B.

The pad bath was applied by a standard padding procedure to a polyester warp/rayon filling fabric obtaining a 100% wet pickup. The fabric was dried at 225° F. and then heated at 310° F. for 2.0 minutes. The smoothness of the fabric after 5 home-style launderings was very good. The hand of the treated fabric was firmer than the untreated fabric and the firmness was durable to laundering.

EXAMPLE 9

A series of pad baths were prepared containing the product of Example 2. The baths were applied to a variety of synthetic fabrics by a standard padding procedure. Sufficient product was used and the wet pickup was adjusted to provide the amount of product solids on the fabric shown in Table I. The fabrics were dried and then heated at 300° F. for 2 minutes.

TABLE I

| Fabric | Percent solids on fabric | Hand rating of fabric* | | |
|---|---|---|---|---|
| | | Untreated fabric | Treated fabric | |
| | | | Initial | Washed 5 times |
| Dacron | 1.5 | 2 | 1 | 1 |
| Nylon | 1.3 | 2 | 1 | 1 |
| Acetate | 2.1 | 2 | 1 | 1 |
| Acrylic | 1.4 | 2 | 1 | 1 |

*1 is firmest rating on a scale of 1–5.

I claim:

1. A solution in perchloroethylene of (1) a polyester resin, prepared by reacting 100 parts of a lower alkylene glycol with 160 to 210 parts of an aromatic dicarboxylic acid, 70 to 100 parts of a dimerized fatty acid and 5 to 10 parts of a lower unsaturated aliphatic dibasic acid, and (2) a nonionic or anionic surfactant wherein the solution contains between 45% and 60% of polyester resin and between 22% and 35% of perchloroethylene.

2. The solution of claim 1 wherein said surfactant is nonionic.

3. The solution of claim 2 wherein said nonionic surfactant is a mixture of an ethoxylated alkyl phenol and a coconut amide wherein the ethoxylated alkyl phenol is between 10% and 15% of the solution and the coconut amide is between 4% and 8% of the solution.

4. A solution in perchloroethylene according to claim 1 of (1) a polyester resin, prepared by reacting a mixture of ethylene glycol and propylene glycol with (a) phthalic acid, (b) a dimerized acid obtained from $C_{18}$ polyunsaturated fatty acid and containing 75% of $C_{36}$ dibasic acid and 25% of $C_{54}$ tribasic acid, and (c) fumaric acid, (2) the reaction product of nonylphenol and about 30 moles of ethylene oxide, and (3) the reaction product of one equivalent of coconut oil with two moles diethanolamine.

5. A composition comprising an aqueous dispersion of a solution in perchloroethylene of (1) a polyester resin, prepared by reacting 100 parts of a lower alkylene glycol with 160 to 210 parts of an aromatic dicarboxylic acid, 70 to 100 parts of a dimerized fatty acid and 5 to 10 parts of a lower unsaturated aliphatic dibasic acid, and (2) a nonionic or anionic surfactant, wherein the dispersion contains between 0.5% and 20% polyester resin and between 0.10 and 20% of perchloroethylene.

6. A composition according to claim 5 containing in addition a thermosetting, aminoplast resin wherein the amount of aminoplast resin is sufficient to provide an aminoplast finish which amounts to between 5–45% based on the weight of textile materials on which applied.

7. A process for providing an improved hand to a textile which comprises applying the composition of claim 5 in combination with a thermosetting, aminoplast resin and an acid-acting catalyst, to textile materials.

8. A textile material having improved hand treated with an aqueous dispersion of a solution in perchloroethylene of (1) a polyester resin, prepared by reacting 100 parts of a lower alkylene glycol with 160 to 210 parts of an aromatic dicarboxylic acid, 70 to 100 parts of a dimerized fatty acid and 5 to 10 parts of a lower unsaturated aliphatic dibasic acid, and (2) a nonionic or anionic surfactant wherein the dispersion contains between 0.5% and 20% polyester resin and between 0.10 and 20% of perchloroethylene, a thermosetting aminoplast resin wherein the amount of aminoplast finish is 5–45% based on the weight of the textile material, and an acid-acting catalyst.

References Cited

UNITED STATES PATENTS

| | | | |
|---|---|---|---|
| 2,295,699 | 9/1942 | Thackston | 260—29.2 |
| 2,825,708 | 3/1958 | Auer | 260—22 |
| 3,124,549 | 3/1964 | Salgado et al. | 260—22 |
| 3,158,584 | 11/1964 | Layman | 260—22 |
| 3,223,658 | 12/1965 | Kraft et al. | 260—22 |
| 3,384,509 | 5/1968 | Ritson et al. | 117—155 |
| 3,494,882 | 2/1970 | Andrews | 260—22 |

DONALD E. CZAJA, Primary Examiner

R. W. GRIFFIN, Assistant Examiner

U.S. Cl. X.R.

117—139.5 A, 161 K; 260—22 D, 29.2 N, 29.2 E, 33.8 R